United States Patent
Ronen et al.

(10) Patent No.: US 10,558,490 B2
(45) Date of Patent: Feb. 11, 2020

(54) MECHANISM FOR ISSUING REQUESTS TO AN ACCELERATOR FROM MULTIPLE THREADS

(75) Inventors: Ronny Ronen, Haifa (IL); Boris Ginzburg, Haifa (IL); Eliezer Weissmann, Haifa (IL)

(73) Assignee: Intel Corporation, Santa Clara, CA (US)

( * ) Notice: Subject to any disclaimer, the term of this patent is extended or adjusted under 35 U.S.C. 154(b) by 40 days.

(21) Appl. No.: 13/992,865

(22) PCT Filed: Mar. 30, 2012

(86) PCT No.: PCT/US2012/031650
§ 371 (c)(1),
(2), (4) Date: Aug. 21, 2014

(87) PCT Pub. No.: WO2013/147881
PCT Pub. Date: Oct. 3, 2013

(65) Prior Publication Data
US 2014/0359629 A1   Dec. 4, 2014

(51) Int. Cl.
*G06F 9/48* (2006.01)
*G06F 12/1027* (2016.01)

(52) U.S. Cl.
CPC ........ *G06F 9/4881* (2013.01); *G06F 12/1027* (2013.01)

(58) Field of Classification Search
None
See application file for complete search history.

(56) References Cited

U.S. PATENT DOCUMENTS

| | | | |
|---|---|---|---|
| 8,423,749 B2 * | 4/2013 | Mejdrich | G06F 9/54 712/30 |
| 2003/0033345 A1 * | 2/2003 | Keefer | G06F 9/5072 718/102 |
| 2003/0033479 A1 | 2/2003 | Gruner et al. | |
| 2004/0187122 A1 | 9/2004 | Gosalia et al. | |
| 2008/0046684 A1 * | 2/2008 | Emma | G06F 9/3851 712/14 |

(Continued)

FOREIGN PATENT DOCUMENTS

| | | |
|---|---|---|
| CN | 1538296 A | 10/2004 |
| EP | 1814026 A2 | 8/2007 |
| KR | 20060081419 A | 7/2006 |

OTHER PUBLICATIONS

Office action and Search Report with English translation from Chinese Patent Application No. 201280072132.4, dated May 30, 2016, 14 pages.

(Continued)

*Primary Examiner* — Eric C Wai
(74) *Attorney, Agent, or Firm* — Nicholson De Vos Webster & Elliott LLP

(57) ABSTRACT

An apparatus is described having multiple cores, each core having: a) a CPU; b) an accelerator; and, c) a controller and a plurality of order buffers coupled between the CPU and the accelerator. Each of the order buffers is dedicated to a different one of the CPU's threads. Each one of the order buffers is to hold one or more requests issued to the accelerator from its corresponding thread. The controller is to control issuance of the order buffers' respective requests to the accelerator.

19 Claims, 10 Drawing Sheets

(56) References Cited

U.S. PATENT DOCUMENTS

| | | | |
|---|---|---|---|
| 2008/0112236 A1* | 5/2008 | Takase | G11C 5/143 365/195 |
| 2009/0189686 A1* | 7/2009 | Yamada | G06F 1/3203 327/544 |
| 2009/0216958 A1* | 8/2009 | Biles | G06F 13/1668 711/148 |
| 2010/0199283 A1* | 8/2010 | Kido | G06F 9/4812 718/103 |
| 2011/0022817 A1* | 1/2011 | Gaster | G06F 9/5044 711/202 |
| 2011/0161619 A1 | 6/2011 | Kaminski et al. | |
| 2012/0030421 A1* | 2/2012 | Chang | G06F 13/126 711/108 |
| 2012/0066474 A1 | 3/2012 | Funk | |
| 2012/0239904 A1* | 9/2012 | Ekanadham | G06F 9/30043 711/207 |
| 2014/0007098 A1* | 1/2014 | Stillwell, Jr. | G06F 9/30003 718/1 |

OTHER PUBLICATIONS

PCT/US2012/031650 Notification of Transmittal of International Search Report and Written Opinion, dated Nov. 20, 2012, 6 pages.
European Search Report in corresponding EP Application 12873133.8, dated Apr. 11, 2016, 8 pages.
International Preliminary Report on Patentability for Application No. PCT/US2012/031650, dated Oct. 9, 2014, 7 pages.

\* cited by examiner

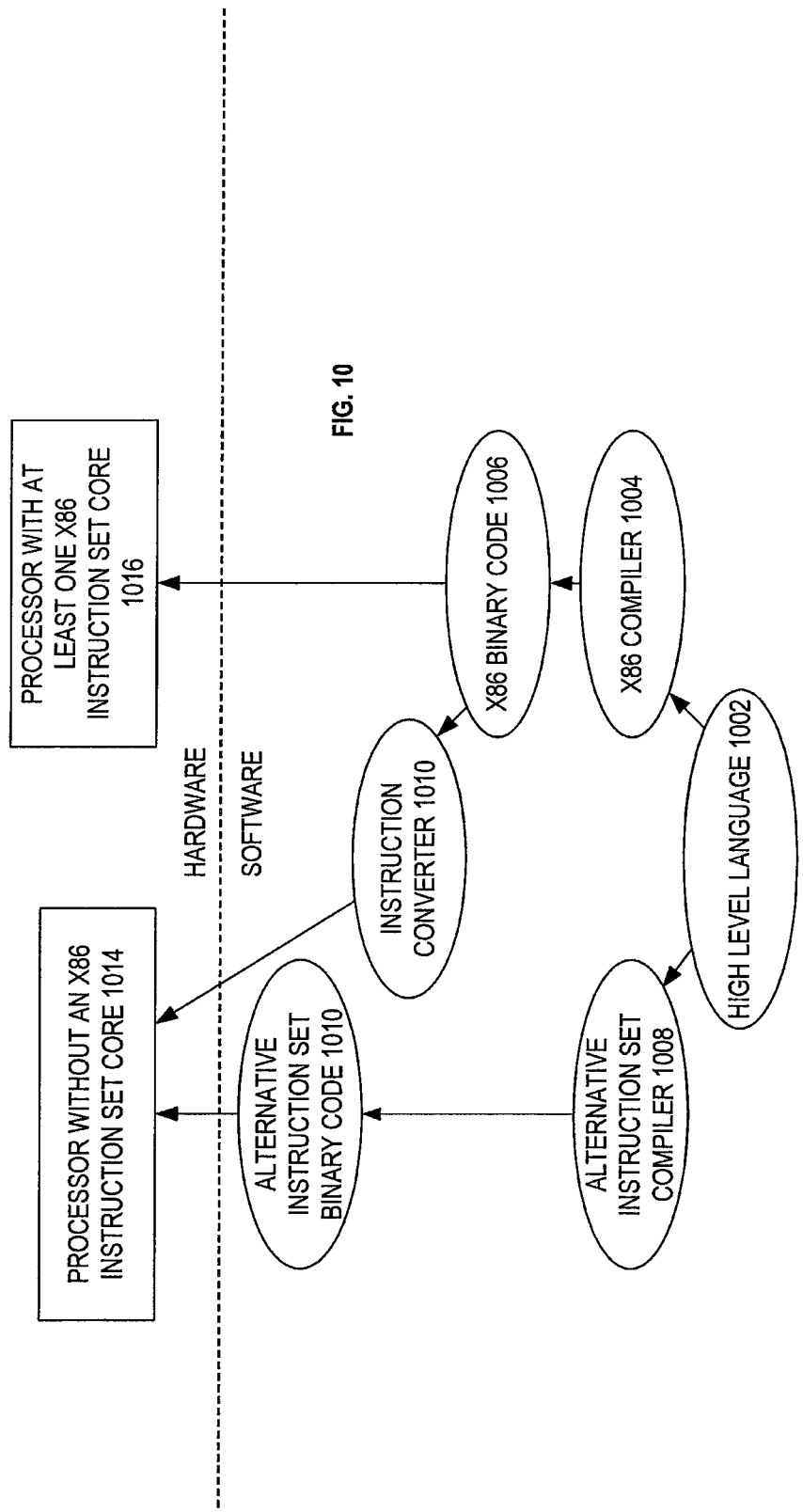

MECHANISM FOR ISSUING REQUESTS TO AN ACCELERATOR FROM MULTIPLE THREADS

CROSS-REFERENCE TO RELATED APPLICATION

This patent application is a U.S. National Phase Application under 35 U.S.C. § 371 of International Application No. PCT/US2012/031650, filed Mar. 30, 2012, entitled MECHANISM FOR ISSUING REQUESTS TO AN ACCELERATOR FROM MULTIPLE THREADS.

FIELD OF INVENTION

The field of invention relates generally to the computing system design, and, more specifically, to a mechanism for issuing requests to an accelerator from multiple threads.

BACKGROUND

Traditional Integration of Co-Processors

As semiconductor manufacturing processes are reaching an era that approaches 1 trillion transistors per die, design engineers are presented with the issue of how to most effectively put to use all the available transistors. One design approach is to implement specific computation intensive functions with dedicated hardware "acceleration" on die along with one or more general purpose CPU cores.

Acceleration is achieved with dedicated logic blocks designed to perform specific computation intensive functions. Migrating intensive computations to such dedicated logic blocks frees the general purpose CPU core(s) from executing significant numbers of instructions thereby increasing the effectiveness and efficiency of the CPU core(s).

Although "acceleration" in the form of co-processors (such as graphics co-processors) is known in the art, such traditional co-processors are viewed by the OS as a separate "device" (within a larger computing system) that is external to the CPU core(s) that the operating system (OS) runs on. These co-processors are therefore accessed through special device driver software and do not operate out of the same virtual memory space as a CPU core. As such, traditional co-processors do not share or contemplate the virtual addressing-to-physical address translation scheme implemented on a general purpose CPU core.

Moreover, large latencies are encountered when a task is offloaded by an OS to a traditional co-processor. Specifically, as a CPU and a traditional co-processor essentially correspond to separate, isolated sub-systems, significant communication resources are expended when tasks defined in an application running on a CPU core are passed from the application through the OS "kernel" to the driver which manages the co-processor. Such large latencies favor system designs that invoke relatively infrequent tasks on the co-processor from the main OS but with large associated blocks of data per task. In effect, traditional co-processors are primarily utilized in a coarse grain fashion rather than a fine grain fashion.

As current system designers are interested in introducing more acceleration into computing systems with finer grained usages, a new paradigm for integrating acceleration in computing systems is emerging.

BRIEF DESCRIPTION OF THE DRAWINGS

The present invention is illustrated by way of example and not limitation in the figures of the accompanying drawings, in which like references indicate similar elements and in which:

FIG. 10 shows a software instruction converter.

DETAILED DESCRIPTION

Figure 1:
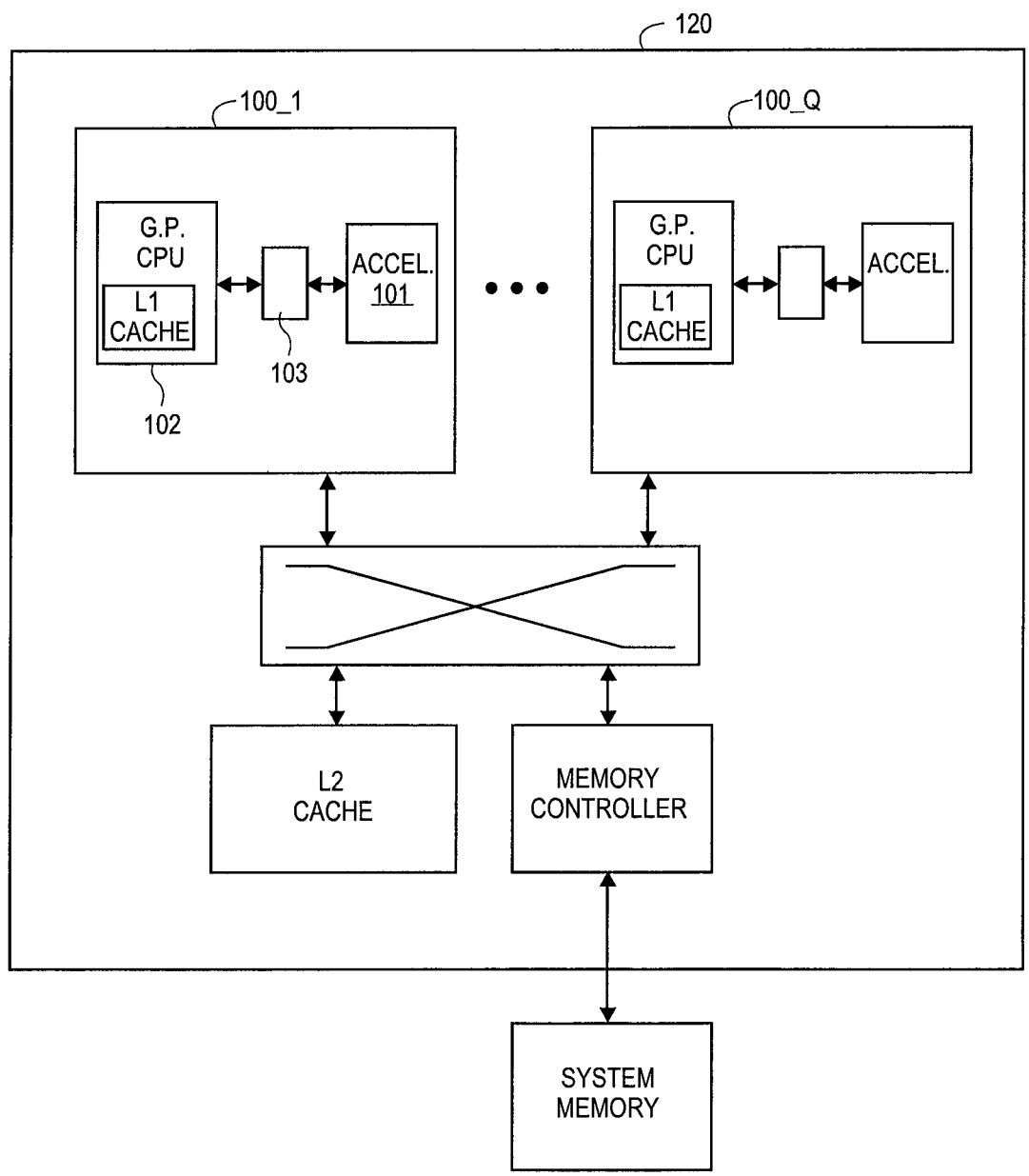
FIG. 1 shows a computing system whose processing cores each include a general purpose CPU and an accelerator that is tightly coupled to the general purpose CPU.

FIG. 1 shows new processing core 100_1 architecture in which an accelerator 101 akin to a large scale functional unit that is designed into the core 100_1 and is tightly coupled to the core's general purpose CPU 102. Multiple such cores 100_1 to 100_Q may be disposed on a single processor 120 integrated into a semiconductor chip. As described in more detail below, in a typical implementation, the accelerator 101 supports a plurality of different computation intensive tasks.

Here, with respect to the operation of a single core such as core 100_1, standard instructions are read from memory and/or cache and executed by the core's general purpose CPU 102. Other types of instructions that are received by the processing core 100_1, however, will trigger the accelerator 101 into action. In a particular implementation, the underlying hardware support's the software's ability to call out a specific acceleration task in code. That is, a specific command can be embodied into the code by the software programmer (or by a compiler), where, the specific command calls out and defines a specific acceleration task to be performed by the accelerator 101 as well as the input operand(s) for the specific task.

The command is ultimately represented in some form of object code. During runtime, the underlying hardware "executes" the object code and, in so-doing, invokes the accelerator 101 and passes the associated input data to the accelerator 101. FIG. 1 shows the accelerator 101 being coupled to the general purpose CPU 102 to illustrate the issuance of a command to the accelerator 101. More details concerning a specific technique for invoking an acceleration unit are discussed in more detail further below.

Upon being invoked, the accelerator 101 operates out of the same memory space as the general purpose CPU 102. As such, data operands may be identified to/by the accelerator with virtual addresses whose corresponding translation into physical address space is the same as those used by the general purpose CPU 102. Said another way, the accelerator 101 operates out of the same virtual memory space as the CPU 102. Moreover, generally, the execution time of the accelerator's execution of a command is longer than that of a traditional/standard instruction within the general purpose CPU 102 (owing to the complex nature of the tasks being performed by the accelerator 101). The input operand(s)

and/or resultant may also be larger than the standard register sizes used by the functional units of the general purpose CPU 102.

The accelerator 101 can therefore be generally viewed as being coarser grained (having larger execution times and/or operating on larger data chunks) than the traditional functional units and associated instructions of the general purpose CPU 102. At the same time, the accelerator 101 can also generally be viewed as being finer grained, or at least more tightly coupled to the general purpose CPU 102 than a traditional co-processor.

Specifically, the avoidance of a time expensive "driver call" invocation of the accelerator and the sharing of same memory space (including virtual to physical address translations) by the accelerator 101 and the general purpose CPU 102 correspond to tighter coupling to the general purpose CPU 102 than a typical co-processor. Moreover, the specific individual tasks that the accelerator 101 can be called on to perform may also be more fine grained than the larger, wholesale tasks traditionally performed by a co-processor. Specific individual tasks that are suitable for implementation with the accelerator as a single "invokable" operation include texture sampling, motion search or motion compensation, security related computations (e.g., cryptography, encryption, etc.), specific financial computations, and/or specific scientific computations.

Modern day general purpose CPU cores are typically capable of concurrently executing multiple threads (for example Intel processors use Simultaneous Multi Threading technology). Note that the general purpose CPU 102 may have one or more pipelines to process traditional instructions. Concurrent execution of multiple threads with multiple pipelines is a straightforward concept. However, a single pipeline can also be designed to support concurrent execution of multiple threads as well.

Accordingly, as observed in FIG. 1, a processing core 100_1 may be designed with special logic 103 designed to permit any/all of the multiple threads that are executed by the core's general purpose CPU 102 to invoke the accelerator 101. Recalling that a feature of tighter coupling between the general purpose CPU 102 and the accelerator 101 is utilization of the same virtual-to-physical address translation between the two, in the case of a multi-threaded core, each thread may have its own unique virtual-to-physical address translation scheme.

As such, when the accelerator performs a task for a particular thread it adopts of the virtual-to-physical address translation scheme of the thread (e.g., by maintain in itself a same translation look-aside buffer (TLB) as within the CPU 102 for the thread, and/or, utilizing the TLB in the CPU 102 for the thread). Details concerning possible designs for the special logic 103 are presented in more detail further below with respect to FIGS. 2 through 5.

Figure 2:
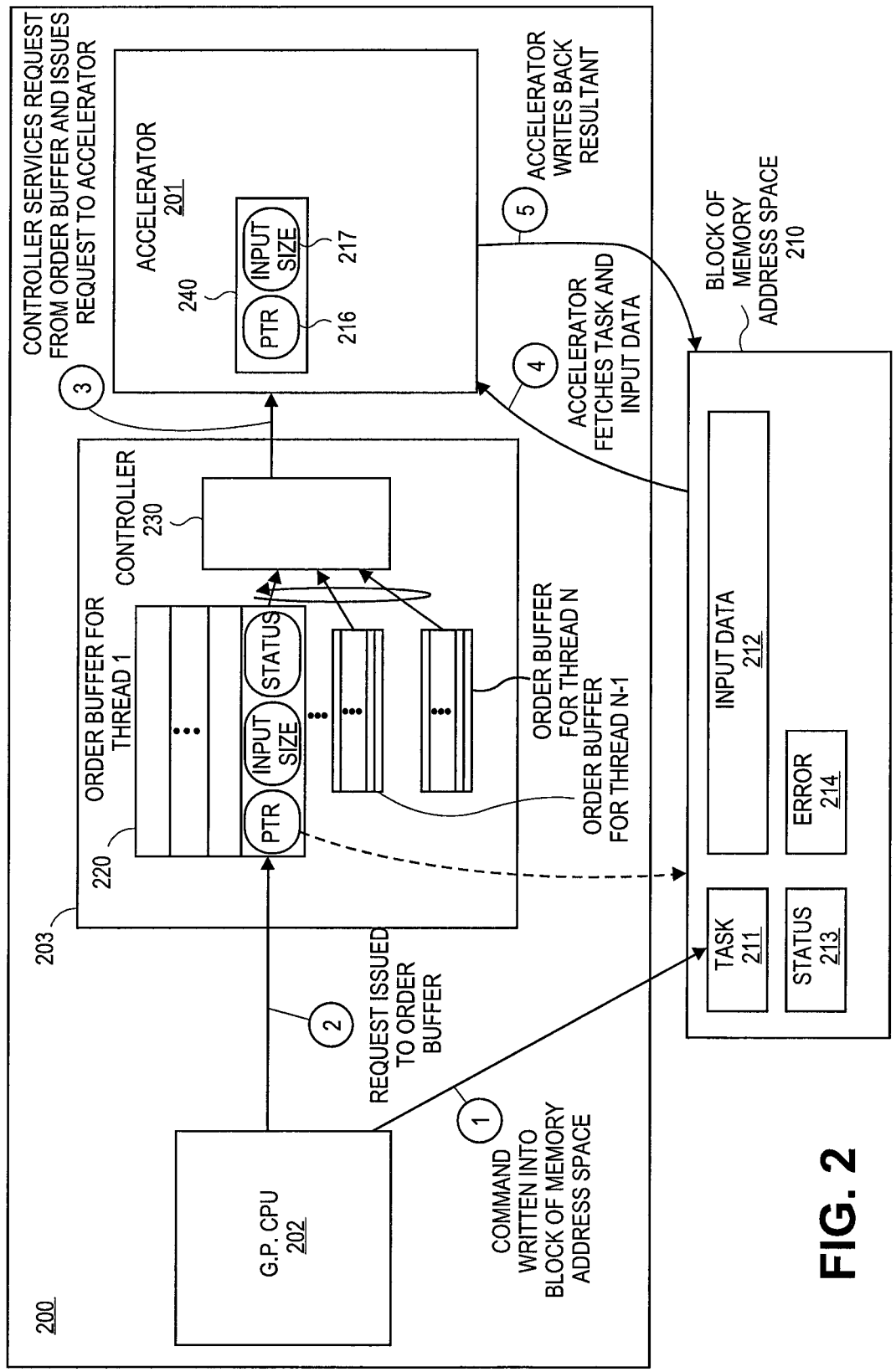
FIG. 2 shows a technique for a thread on a general purpose CPU to invoke an accelerator.

FIG. 2 depicts an embodiment of a mechanism by which a thread can invoke the accelerator. As observed in FIG. 2, the object code responsible for invoking a specific accelerator first constructs a command for the accelerator in a block of memory address space 210. Whether the contents of the command are actually stored in memory or in a cache that is on the same semiconductor chip as the core is a matter of designer choice.

In writing the command, the general purpose CPU 202 writes within the block of memory address space 210 (whether in cache or in system memory): 1) the task to be executed 211; and, 2) the input data for the task 212. The block of memory space also has space for status information concerning the task 213, and a field of space to indicate any error in executing the task 214. The CPU 202 may initially set status field 213 to indicate that the new request is pending. The output/resultant 215 of the task may be written in the memory space reserved for the input 212 and/or additional address space within the block 210 beyond where the input information is placed. The accelerator 201 can write to any of fields 213, 214 and writes the output/resultant in the memory address space.

Upon the command being written into the memory address space, the general purpose CPU 202 issues a request to an order buffer 220. The order buffer 220 is reserved for the thread that has invoked the accelerator 201 and essentially corresponds to a queue or other structure used to track and control multiple requests made to the accelerator 201 by the thread.

In an embodiment, there are N order buffers for each of N threads supported by the general purpose CPU 202. According to one embodiment, if the general purpose CPU 202 can support a maximum of N active threads, the special logic 203 within the core 200 is designed to also include N order buffers (one for each thread under a worst case condition).

If the general purpose CPU 202 further supports active thread switching, where M>N threads are recognizable to the CPU 202 but only a maximum of N threads can be simultaneously active (presently able to execute object code), the content of an order buffer may be switched if the thread it is supporting is switched "out" in favor of another thread that is switched "in". That is, when a thread is switched out of the core 200 as part of its being taken out of a currently active state, the context information within the order buffer for the thread is switched out of the core 200 (e.g., into L2 cache or memory) along with the general purpose CPU's associated context information for the thread (e.g., internal register content). In its place, the corresponding context information for the newly activated thread is loaded (e.g., from L2 cache or memory) into the general purpose CPU 202 and order buffer respectively. More information concerning context switching is provided in more detail further below.

Returning to a description of FIG. 2, upon a thread having issued a request to its corresponding order buffer 220 for a particular task to be performed by the accelerator 201, the request is effectively queued in the thread's order buffer 220 until it is serviced by a controller 230 that controls access to the accelerator 201. The controller 230 may be designed to implement one or more various load balancing techniques and/or fairness algorithms, such as, for example, granting access to the accelerator 201 according to a round robin servicing scheme across the N threads/order buffers. This may be accomplished, for example, by the controller 230 polling each order buffer in a round robin fashion.

Upon the request being serviced by the controller 230, the request is essentially forwarded to the accelerator 201. In an embodiment the request 240 includes a memory address pointer 216 of the aforementioned block of memory address space 210 where the requested task 211 and associated input data 212 resides. In a further embodiment, the request also includes an indication of the size 217 of the input data 212.

In response, the accelerator 201 fetches the task 211 and input data 212, executes the specific task and writes back the resulting information back in the appropriate section of the memory address space 210. The status field 213 associated with the task is set by the accelerator 201 to indicate that the task is completed. The thread that originally issued the request for the accelerator also monitors the status field 213 and recognizes that the data resulting from the accelerator's operations is available. At this point, the thread begins to make use of the resultant and moves forward with whatever operations where dependent upon it.

Moreover, with the completion of the request, the controller 230 is free to issue a next request from whatever order buffer is appropriate in view of the controller's load balancing scheme. It is pertinent to note that the accelerator 201 may be designed to concurrently execute multiple tasks. For example, the accelerator 201 may be designed to include multiple functional units each designed to handle its own task and that can operate concurrently or otherwise in parallel with the operation of other functional units. As such, the controller 230 may be designed to issue multiple requests to the accelerator 201 prior to any of the requests being completed by the accelerator. Moreover, if any two or more of the functional units are designed to support the same task, the controller can issue multiple requests of the same task to the accelerator prior to the completion of any one of them.

Figure 3:
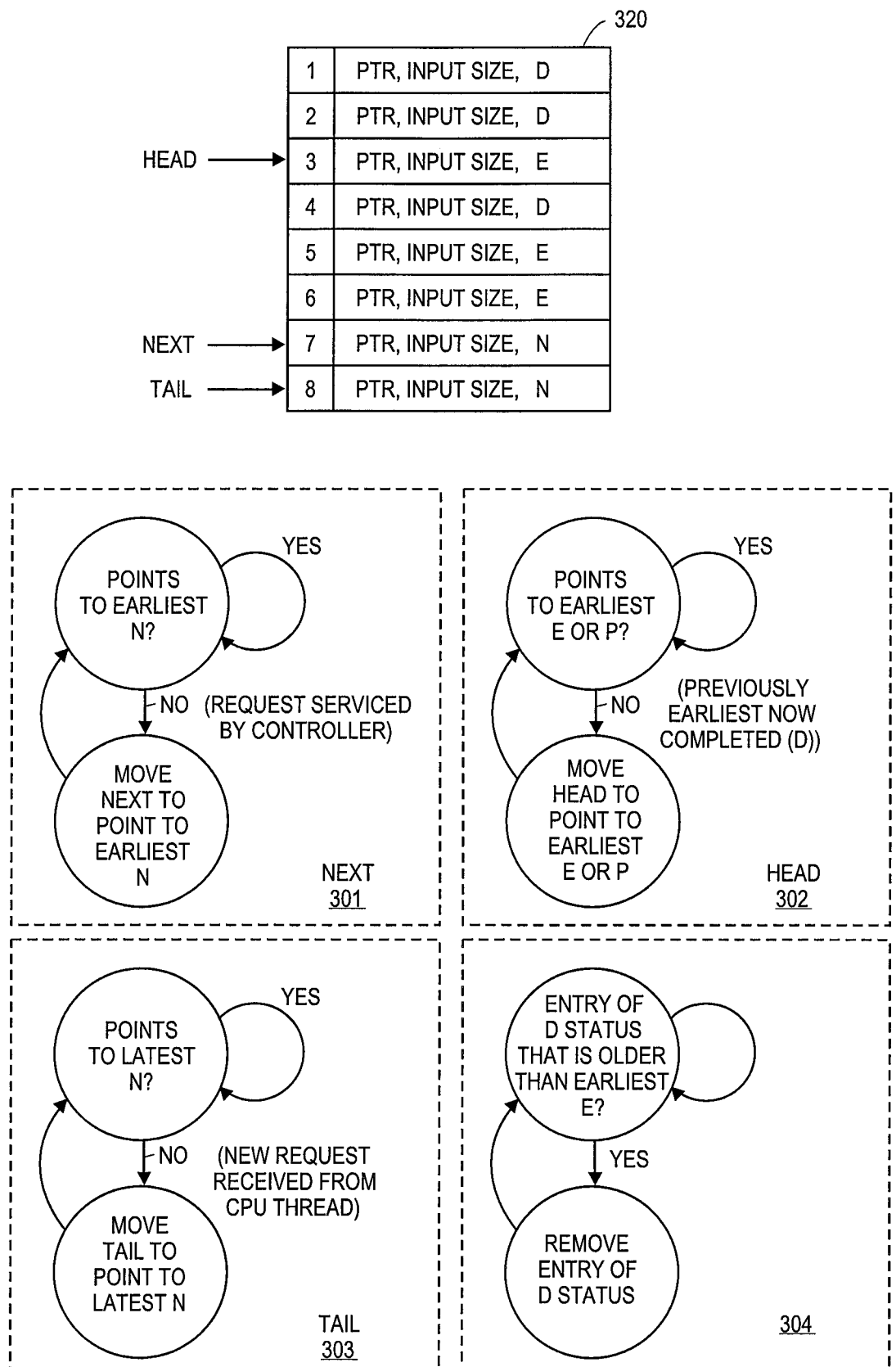
FIG. 3 shows an order buffer and associated state diagrams.

FIG. 3 shows an exemplary embodiment of an order buffer 320 for a particular thread and associated state diagrams. As observed in FIG. 3, head, tail and next pointers point to specific entries within the order buffer 320. The order buffer 320 essentially contains the recently issued requests from the thread that the order buffer is dedicated to, and, a status of each such request. As alluded to above, each request may be embodied as a memory address pointer that identifies where the requested task and input data can be found. The request may also include, as described above, an indication of the size of the input data (e.g., in units of cache lines). The order buffer 320 may be implemented with registers used to hold the actual requests and logic circuitry may be used to implement the pointers and state diagrams described below.

In an embodiment, besides its associated request, each entry in the buffer 320 may specify the status of the request. In a further embodiment, the status of each request is one of:

i) N . . . New: the request has not yet been serviced by the controller;

ii) E . . . Executing: the request has been serviced by the controller and is presumed to be executing with an accelerator;

iii) D . . . Done: the accelerator has performed the task requested by the request;

iv) P . . . Page Fault: a page fault has been raised in attempting to execute the requested task;

v) I . . . the entry is invalid

Each of the above statuses will be described more fully below.

State diagram 301 depicts operation of the "next" pointer. The "next" pointer points to the next request in the order buffer to be offered to the controller for subsequent execution by the accelerator. According to state diagram 301, the next pointer continually adjusts itself to point to the earliest entry in the order buffer that has a New (N) status. Here, entries are listed in the order buffer in the order that their corresponding requests were received from the buffer's corresponding thread (e.g., the request of entry 2 was received after the request of entry 1). As such, the order buffer is designed to provide requests to the controller in the same order that they were issued by the thread. When a request of status N is serviced by the controller, the status of the request changes to E (Executing). As such, the next pointer adjusts to the next earliest request that has a status of N. Frequently this is the next later entry in the buffer.

State diagram 302 depicts operation of the "head" pointer. The head pointer points to the earliest entry in the order buffer that does not have a status of D (Done) or New (N). As such, the head pointer essentially points to the earliest "live" request (or, said another way, earliest request that has not yet completed). In a typical flow, the earliest entry that does have a status of D or N, is the earliest request with a status of E (Executing). That is, the "head" pointer typically points to the earliest request that is still executing in the accelerator.

When the request that is pointed to by the head pointer finally completes successfully, its status in the order buffer changes from E to D. As such, the head pointer has to move to the next earliest request in the buffer that does not have a status of D or N. Typically this entails changing the head pointer to point to the next later entry in the buffer. Note that although this may be a common situation it is not guaranteed as the accelerator may simultaneously entertain multiple requests from a same buffer, and different tasks may have different execution time to completion. As such, a later request may finish earlier than an earlier request. As such, a status pattern of "EDE" and the like (with a D between two Es) may exist across the buffer entries.

State diagram 303 depicts operation of the tail pointer which points to the latest entry having an status of N. Frequently the latest entry in the buffer having a status of N is the last entry in the buffer (being the most recently received (latest) request and not having been serviced yet).

State diagram 304 shows a state diagram for removing entries from the order buffer. According to the state diagram, any entry having a status of D that is earlier than the earliest entry having a status of E is removed from the order buffer.

In an embodiment, any entries not between the head and tail pointers inclusive are given a status of invalid.

Figure 4:
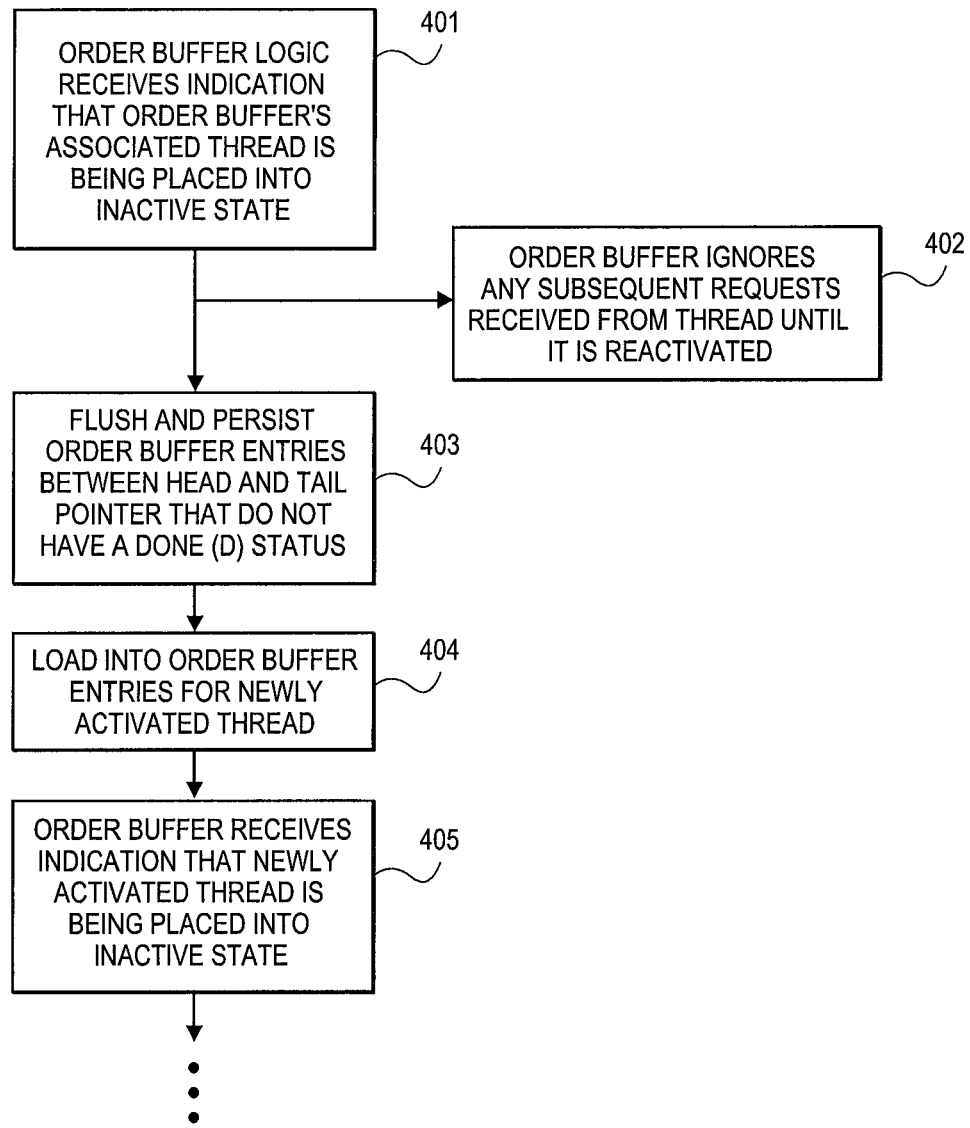
FIG. 4 shows a thread switching process.

FIG. 4 pertains to the specifics of context switching. As observed in FIG. 4, the order buffer's associated logic receives an indication that the thread that the buffer is dedicated to is being switched out of the active state 401. Thereafter, any requests received from the thread are ignored 402 (until the thread is changed back to the active state). All the entries in the buffer between the head and tail pointers that do not have a done (D) status are then flushed from the buffer and externally persisted 403 (e.g., saved in memory or cache).

Here, for each entry, the memory address pointer, input data size and status indication are persisted. The accelerator context (e.g., data values in accelerator register space) for each of the tasks whose entries are being persisted is also persisted as is the context of the thread that is being deactivated. The context of the thread may include, for example, values in registers of the general purpose CPU being used to support the thread (apart from operand data, other values stored in such registers may correspond to virtual to physical address translations).

Subsequently, the persisted entries of the newly activated thread that the buffer is to be newly dedicated to are loaded into the buffer 404. The persisted state of the newly activated thread as well as the accelerator state for any of the buffer entries being loaded are loaded into the general purpose CPU and accelerator respectively. In an embodiment, if the accelerator does not have room for the state information of an accelerator task of a newly activated thread (e.g., because the accelerator task that is being reinstated is the same as a valid task of another thread that is currently executing), the accelerator is configured to load the persisted state information when space becomes available.

The controller, with knowledge of the situation, may be designed to prevent any further issues of the specific task to the accelerator from another thread until the newly restored accelerator task is loaded and completed. Once the buffer is loaded with the persisted entries and the state of the persisted accelerator task(s) is loaded in the accelerator, the accelerator can "pick up where it left off" when the newly restored thread was first put into the inactive state.

Some time later, the newly activated thread is deactivated 405 and the original thread that was inactivated in processes 401-403 is re-instated by essentially the same process described above with respect to process 404.

Figure 5:
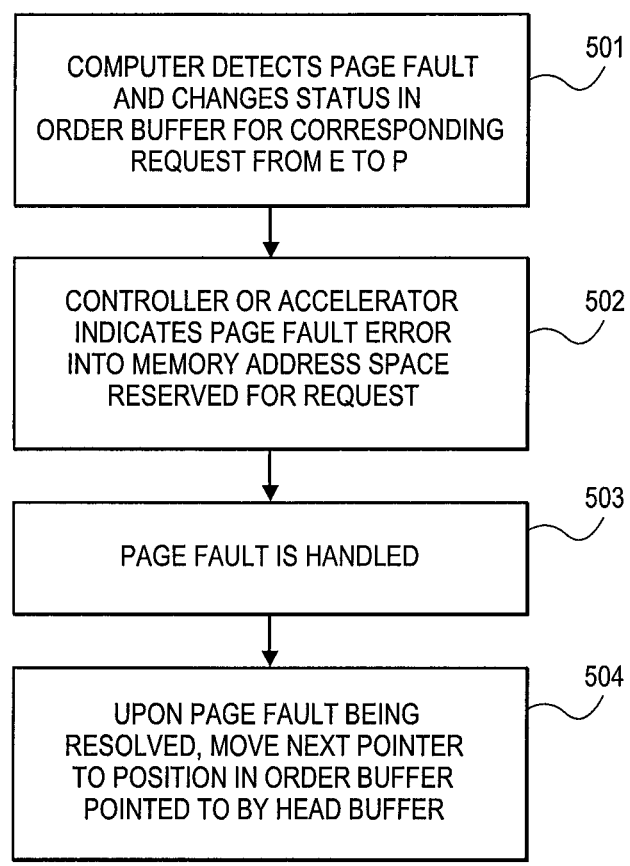
FIG. 5 shows a process for handling page faults.

FIG. 5 depicts the handling of page faults. Here, recall that the accelerator may be designed to refer to the same virtual address space and utilize the same virtual to physical address translation as the thread of the general purpose CPU that has invoked the accelerator. As such, just as the general purpose CPU can suffer a page fault, so too can the accelerator. A page fault essentially corresponds to recognition of a problem in the virtual to physical address translation by hardware that is attempting to locate data or an instruction through the translation (e.g., a translation is missing, the virtual address is invalid, etc.).

As observed in FIG. 5, when the accelerator detects a page fault in executing a particular requested task, the controller or the accelerator changes the status in the corresponding buffer entry from executing (E) to page fault (PF) 501. In an embodiment, the controller or accelerator also indicates a page fault in the error status portion of the block of memory address space reserved for the request, and, writes a code specifying the type of page fault in the error portion of the block of memory address space 502.

The page fault is then handled 503. Page fault handling is known in the art and therefore need not be repeated at length here. Page fault handling is a process by which a detected page fault is resolved, often with the improper translation being cured or otherwise fixed. Generally, page faults can be handled in software or in hardware. In the case of hardware page fault handling, special logic circuitry is designed to investigate the type of fault (e.g., missing translation, invalid virtual address, etc.) and provide corrective action if possible.

In the case of software page fault handling, typically, the hardware that detects the page fault throws an exception and writes an error code indicating the type of error. A user, operating system or virtual machine monitor process then detects the thrown exception and attempts to cure the problem. In the present discussion, the hardware and/or software responsible for handling a page fault is responsive to the detection of the fault and looks to the core in the error portion of the memory address block to understand the precise nature of the problem.

When the page fault is resolved, for example by fixing the translation problem, the order buffer is checked to see which requests in the order buffer having the page faulting request have not yet completed 504. Here, it is altogether possible that other requests—even requests issued (to the order buffer and/or accelerator) later than the faulting request—may not suffer a page fault and complete accordingly. As such, only those requests that remain outstanding at the time the page fault is deemed handled are reissued from the controller to the accelerator 504. In an embodiment, this is accomplished simply by moving the next pointer to point to the head position in the queue.

Exemplary Computer Architectures

FIGS. 6-9 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 6:
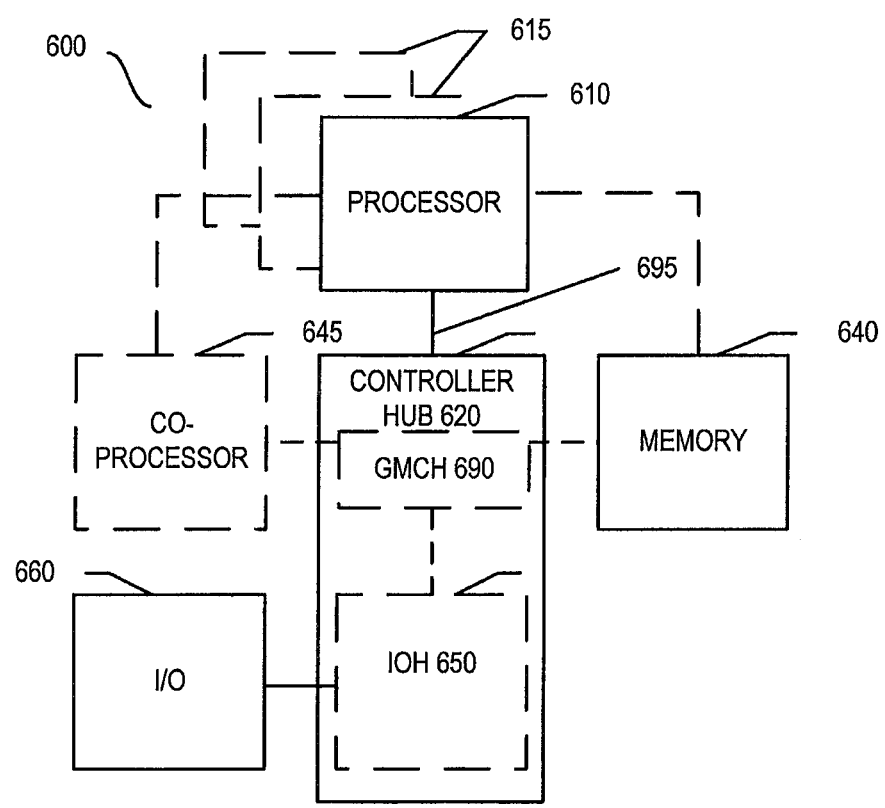
FIG. 6 shows a first computing system embodiment.

Referring now to FIG. 6, shown is a block diagram of a system 600 in accordance with one embodiment of the present invention. The system 600 may include one or more processors 610, 615, which are coupled to a controller hub 620. In one embodiment the controller hub 620 includes a graphics memory controller hub (GMCH) 690 and an Input/Output Hub (IOH) 650 (which may be on separate chips); the GMCH 690 includes memory and graphics controllers to which are coupled memory 640 and a coprocessor 645; the IOH 650 is couples input/output (I/O) devices 660 to the GMCH 690. Alternatively, one or both of the memory and graphics controllers are integrated within the processor (as described herein), the memory 640 and the coprocessor 645 are coupled directly to the processor 610, and the controller hub 620 in a single chip with the IOH 650.

The optional nature of additional processors 615 is denoted in FIG. 6 with broken lines. Each processor 610, 615 may include one or more of the processing cores described herein and may be some version of the processor 1100.

The memory 640 may be, for example, dynamic random access memory (DRAM), phase change memory (PCM), or a combination of the two. For at least one embodiment, the controller hub 620 communicates with the processor(s) 610, 615 via a multi-drop bus, such as a frontside bus (FSB), point-to-point interface such as QuickPath Interconnect (QPI), or similar connection 695.

In one embodiment, the coprocessor 645 is a special-purpose processor, such as, for example, a high-throughput MIC processor, a network or communication processor, compression engine, graphics processor, GPGPU, embedded processor, or the like. In one embodiment, controller hub 620 may include an integrated graphics accelerator.

There can be a variety of differences between the physical resources 610, 615 in terms of a spectrum of metrics of merit including architectural, microarchitectural, thermal, power consumption characteristics, and the like.

In one embodiment, the processor 610 executes instructions that control data processing operations of a general type. Embedded within the instructions may be coprocessor instructions. The processor 610 recognizes these coprocessor instructions as being of a type that should be executed by the attached coprocessor 645. Accordingly, the processor 610 issues these coprocessor instructions (or control signals representing coprocessor instructions) on a coprocessor bus or other interconnect, to coprocessor 645. Coprocessor(s) 645 accept and execute the received coprocessor instructions.

Figure 7:
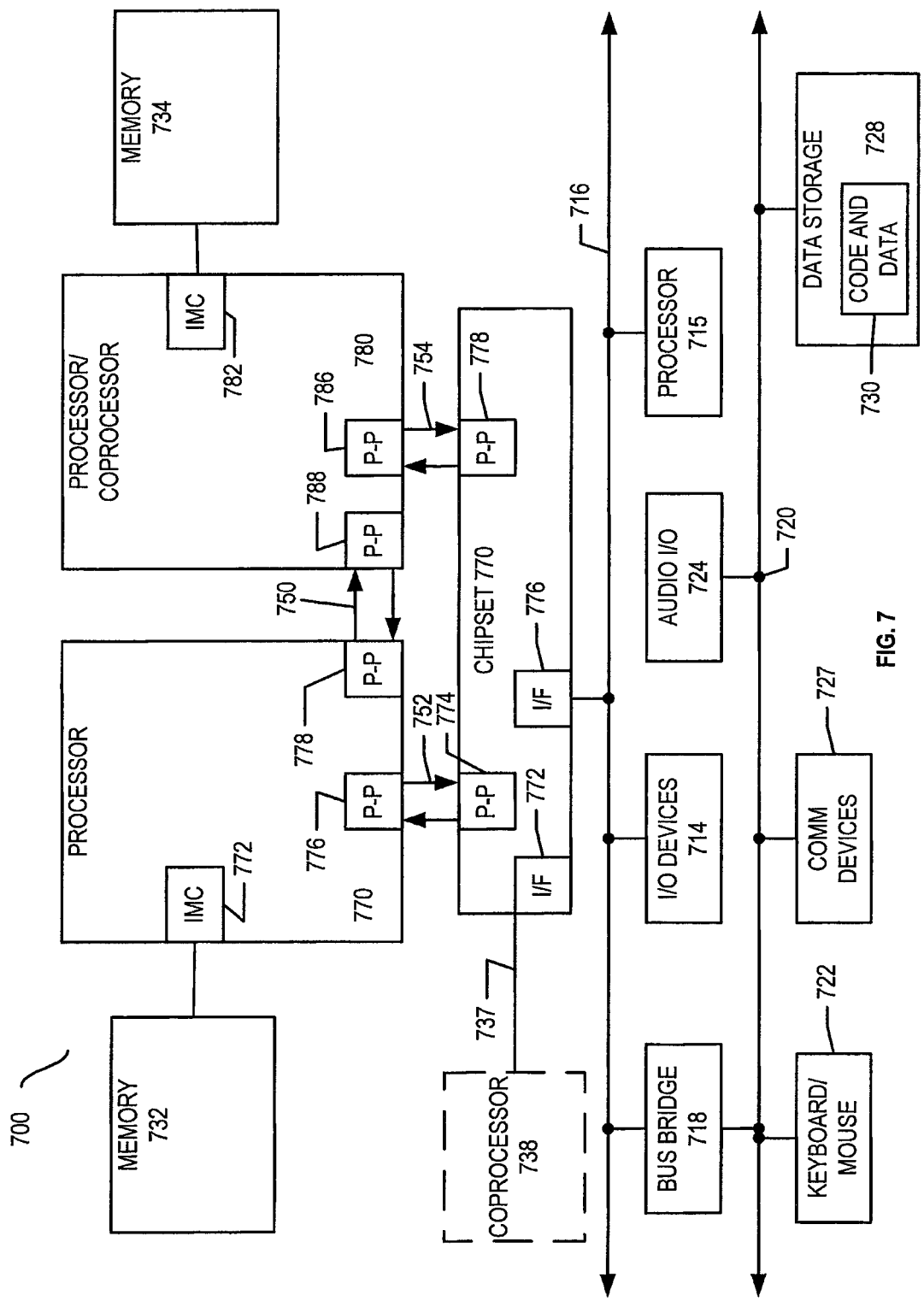
FIG. 7 shows a second computing system embodiment.

Referring now to FIG. 7, shown is a block diagram of a first more specific exemplary system 700 in accordance with an embodiment of the present invention. As shown in FIG. 7, multiprocessor system 700 is a point-to-point interconnect system, and includes a first processor 770 and a second processor 780 coupled via a point-to-point interconnect 750. Each of processors 770 and 780 may be some version of the processor 1100. In one embodiment of the invention, processors 770 and 780 are respectively processors 610 and 615, while coprocessor 738 is coprocessor 645. In another embodiment, processors 770 and 780 are respectively processor 610 coprocessor 645.

Processors 770 and 780 are shown including integrated memory controller (IMC) units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may optionally exchange information with the coprocessor 738 via a high-performance interface 739. In one embodiment, the coprocessor 738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present invention is not so limited.

As shown in FIG. 7, various I/O devices 714 may be coupled to first bus 716, along with a bus bridge 718 which couples first bus 716 to a second bus 720. In one embodiment, one or more additional processor(s) 715, such as coprocessors, high-throughput MIC processors, GPGPU's, accelerators (such as, e.g., graphics accelerators or digital signal processing (DSP) units), field programmable gate arrays, or any other processor, are coupled to first bus 716. In one embodiment, second bus 720 may be a low pin count (LPC) bus. Various devices may be coupled to a second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to the second bus 720. Note that other architectures are possible. For example, instead of the point-to-point architecture of FIG. 7, a system may implement a multi-drop bus or other such architecture.

Figure 8:
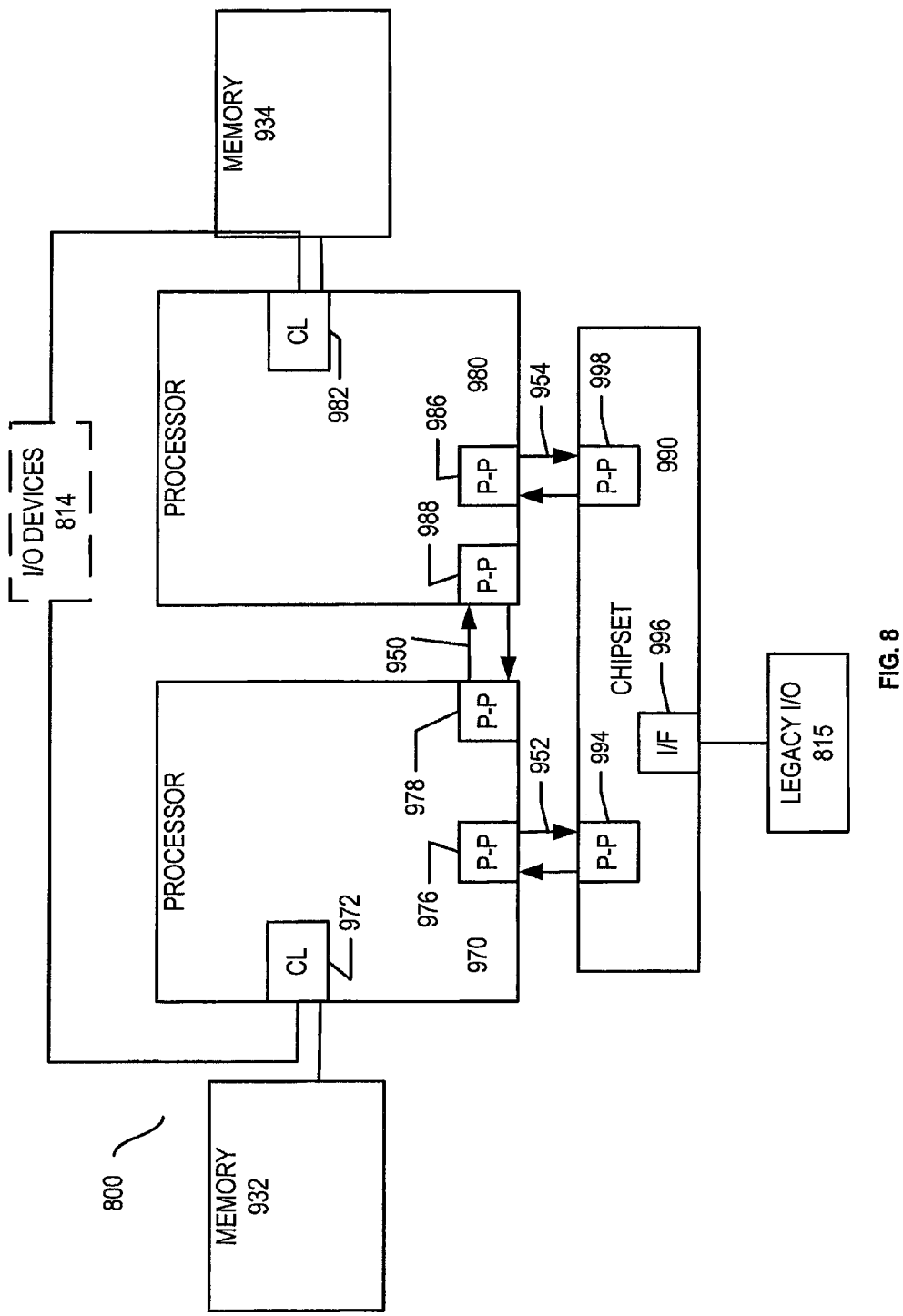
FIG. 8 shows a third computing system embodiment.

Referring now to FIG. 8, shown is a block diagram of a second more specific exemplary system 800 in accordance with an embodiment of the present invention. Like elements in FIGS. 7 and 8 bear like reference numerals, and certain aspects of FIG. 7 have been omitted from FIG. 8 in order to avoid obscuring other aspects of FIG. 8.

FIG. 8 illustrates that the processors 770, 780 may include integrated memory and I/O control logic ("CL") 772 and 782, respectively. Thus, the CL 772, 782 include integrated memory controller units and include I/O control logic. FIG. 8 illustrates that not only are the memories 732, 734 coupled to the CL 772, 782, but also that I/O devices 814 are also coupled to the control logic 772, 782. Legacy I/O devices 815 are coupled to the chipset 790.

Figure 9:
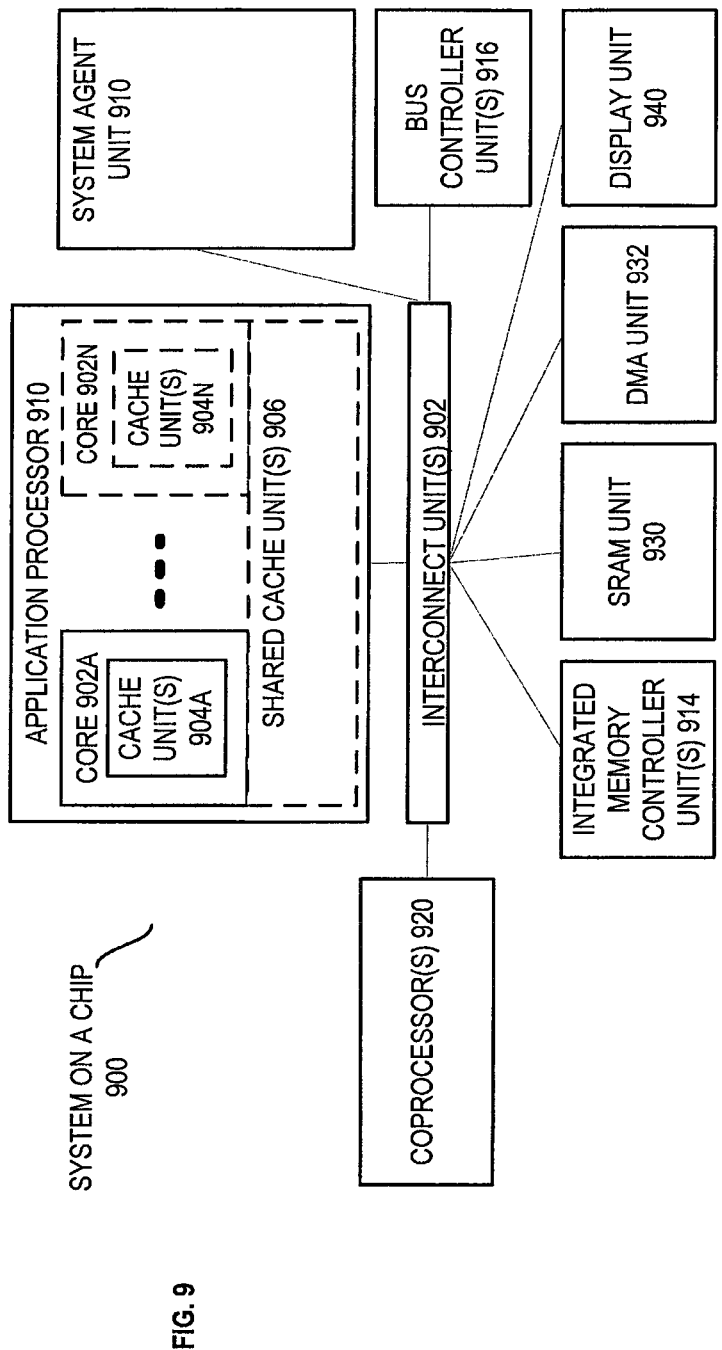
FIG. 9 shows a fourth computing system embodiment.

Referring now to FIG. 9, shown is a block diagram of a SoC 900 in accordance with an embodiment of the present invention. Dashed lined boxes are optional features on more advanced SoCs. In FIG. 9, an interconnect unit(s) 902 is coupled to: an application processor 910 which includes a set of one or more cores 902A-N and shared cache unit(s) 906; a system agent unit 910; a bus controller unit(s) 916; an integrated memory controller unit(s) 914; a set or one or more coprocessors 920 which may include integrated graphics logic, an image processor, an audio processor, and a video processor; an static random access memory (SRAM) unit 930; a direct memory access (DMA) unit 932; and a display unit 940 for coupling to one or more external displays. In one embodiment, the coprocessor(s) 920 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 730 illustrated in FIG. 7, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 10 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 10 shows a program in a high level language 1002 may be compiled using an x86 compiler 1004 to generate x86 binary code 1006 that may be natively executed by a processor with at least one x86 instruction set core 1016. The processor with at least one x86 instruction set core 1016 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1004 represents a compiler that is operable to generate x86 binary code 1006 (e.g., object code) that can, with or without additional linkage processing, be executed on the processor with at least one x86 instruction set core 1016. Similarly, FIG. 10 shows the program in the high level language 1002 may be compiled using an alternative instruction set compiler 1008 to generate alternative instruction set binary code 1010 that may be natively executed by a processor without at least one x86 instruction set core 1014 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1012 is used to convert the x86 binary code 1006 into code that may be natively executed by the processor without an x86 instruction set core 1014. This converted code is not likely to be the same as the alternative instruction set binary code 1010 because an instruction converter capable of this is difficult to make; however, the converted code will accomplish the general operation and be made up of instructions from the alternative instruction set. Thus, the instruction converter 1012 represents software, firmware, hardware, or a combination thereof that, through emulation, simulation or any other process, allows a processor or other electronic device that does not have an x86 instruction set processor or core to execute the x86 binary code 1006.

The invention claimed is:

1. An apparatus, comprising:
a CPU;
an accelerator;
a controller and a plurality of order buffers coupled between said CPU and said accelerator, each of said order buffers dedicated to a different one of said CPU's threads, each one of said order buffers to hold one or more requests issued to said accelerator from its corresponding thread and status information of said request, said controller to control issuance of said order buffers' respective requests to said accelerator based on the status information, wherein the status information is one of new, executing, done, page fault, and invalid.

2. The apparatus of claim 1 wherein one of said requests is composed of a pointer identifying a memory address where said request's associated input data for said accelerator can be found.

3. The apparatus of claim 2 wherein said request is also composed of an indicator of how large said input data is.

4. The apparatus of claim 3 wherein said input data's size is specified as a number of cache lines.

5. The apparatus of claim 1 wherein said accelerator uses same virtual-to-physical address translations as a thread on said CPU that has requested said accelerator to perform a task.

6. The apparatus of claim 1 wherein said accelerator has multiple functional units so as to make said accelerator capable of executing multiple tasks simultaneously.

7. The apparatus of claim 6 wherein said accelerator can execute different instances of the same task simultaneously.

8. The apparatus of claim 1, wherein the status information includes an executing state.

9. A method, comprising:
executing first and second threads in a core of a multiple core semiconductor chip;
issuing a first acceleration request from said first thread to a first order buffer that is dedicated to said first thread, wherein the first order buffer holds two or more requests;
identifying said first request's status as a new request in said first order buffer upon said first request being received by said first order buffer, and, adjusting a tail pointer to point to said first request's entry in said order buffer, wherein the status information is one of new, executing, done, page fault, and invalid;
issuing a second acceleration request from said second thread to a second order buffer that is dedicated to said second thread, wherein the second order buffer holds two or more requests;
issuing said first acceleration request from said first order buffer to an accelerator, said accelerator processing said first request utilizing a first virtual to physical address translation scheme utilized by said first thread; and,
issuing said second acceleration request from said second order buffer to said accelerator, said accelerator processing said second request utilizing a second virtual to physical address translation scheme utilized by said second thread.

10. The method of claim 9 wherein said first request contains a memory address pointer that identifies where input data for said first task can be found.

11. The method of claim 10 wherein said first request also contains an indication of how large said input data is.

12. The method of claim 11 where said indication is articulated as a number of cache lines.

13. The method of claim 9, further comprising adjusting a next pointer to point to said first request's entry in said order buffer when said first request is the earliest new entry in said first order buffer.

14. The method of claim 13 further comprising changing said first request's status in said order buffer from new to executing when said first request is passed to said accelerator and adjusting a head pointer to point to said first request's entry in said first order buffer when said first request is an oldest uncompleted request in said first order buffer.

15. The method of claim 14 further comprising changing said first request's status from executing to done upon said accelerator completing said first request's associated task and deleting said first request from said first order buffer.

16. A method, comprising:
   executing first and second threads in a core of a multiple core semiconductor chip;
   issuing a first acceleration request from said first thread to a first order buffer that is dedicated to said first thread, wherein the first order buffer holds two or more requests;
   issuing a second acceleration request from said second thread to a second order buffer that is dedicated to said second thread, wherein the second order buffer holds two or more requests;
   issuing said first acceleration request from said first order buffer to an accelerator, said accelerator processing said first request utilizing a first virtual to physical address translation scheme utilized by said first thread; and,
   issuing said second acceleration request from said second order buffer to said accelerator, said accelerator processing said second request utilizing a second virtual to physical address translation scheme utilized by said second thread; and,
   switching said first thread from an active state to an inactive state and switching a third thread from an inactive state to an active state, including, replacing said first order buffer's content with requests from said first thread with requests from said third thread.

17. The method of claim 16 wherein said switching said first thread and said switching said third thread includes switching virtual to physical address translations of said first thread out of said CPU, and, switching virtual to physical address translations of said third thread into said CPU.

18. The method of claim 17 wherein said accelerator processes said first and second requests simultaneously.

19. The method of claim 16 wherein said accelerator detects a page fault in processing said second request and writes an indication of said page fault in a block of memory address space where said second request's input data is stored.

* * * * *